US009870579B2

(12) United States Patent
Zuccarino et al.

(10) Patent No.: US 9,870,579 B2
(45) Date of Patent: *Jan. 16, 2018

(54) MANAGING SHAREABLE CONTENT IN A SOCIAL NETWORK

(71) Applicant: Google Inc., Mountain View, CA (US)

(72) Inventors: Scott Zuccarino, San Francisco, CA (US); Paul Moody, Mountain View, CA (US); Rudolf Michael Galfi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/390,243

(22) Filed: Dec. 23, 2016

(65) Prior Publication Data

US 2017/0109798 A1     Apr. 20, 2017

Related U.S. Application Data

(63) Continuation of application No. 13/970,565, filed on Aug. 19, 2013, now Pat. No. 9,560,157.

(51) Int. Cl.
| *G06F 15/16* | (2006.01) |
| *G06Q 30/02* | (2012.01) |
| *H04L 29/08* | (2006.01) |
| *H04L 12/58* | (2006.01) |
| *G06Q 50/00* | (2012.01) |

(52) U.S. Cl.
CPC ......... *G06Q 30/0277* (2013.01); *H04L 51/32* (2013.01); *H04L 67/10* (2013.01); *H04L 67/306* (2013.01); *G06Q 50/01* (2013.01)

(58) Field of Classification Search
CPC ... G06F 17/30011; G06Q 50/01; G06Q 30/02
See application file for complete search history.

(56) References Cited

U.S. PATENT DOCUMENTS

| 2008/0059472 A1* | 3/2008 | Yamamoto | G06F 17/30011 |
| 2010/0318611 A1* | 12/2010 | Curtin | G06F 17/30 709/206 |
| 2011/0258050 A1* | 10/2011 | Chan | G06Q 30/0269 705/14.66 |
| 2012/0072432 A1* | 3/2012 | Crosa | G06F 17/30867 707/748 |
| 2012/0158494 A1 | 6/2012 | Reis et al. | |

(Continued)

*Primary Examiner* — Cheikh Ndiaye
(74) *Attorney, Agent, or Firm* — Lowenstein Sandler LLP

(57) ABSTRACT

Methods are presented for managing shareable content articles in a social network. One of the methods includes receiving a plurality of articles from a publisher for access to selected users in the social network. In one example, the received articles are identified as having premium content. Each of the received articles is assigned a sharing parameter that includes a sharing threshold. The method further includes receiving a request from a first user, who is identified from the selected users of the social network, to share an article identified from the plurality of received articles with a second user in the social network, and providing the second user with access to the article when the sharing threshold is satisfied. The article is presented to the second user with supplemental content.

20 Claims, 14 Drawing Sheets

(56) References Cited

U.S. PATENT DOCUMENTS

| | | | |
|---|---|---|---|
| 2013/0091461 A1* | 4/2013 | Sgro | G06F 3/048 |
| | | | 715/810 |
| 2013/0124338 A1* | 5/2013 | Chen | G06Q 30/0207 |
| | | | 705/14.69 |
| 2013/0346172 A1* | 12/2013 | Wu | G06Q 30/0214 |
| | | | 705/14.16 |
| 2014/0164365 A1* | 6/2014 | Graham | G06Q 50/01 |
| | | | 707/723 |

\* cited by examiner

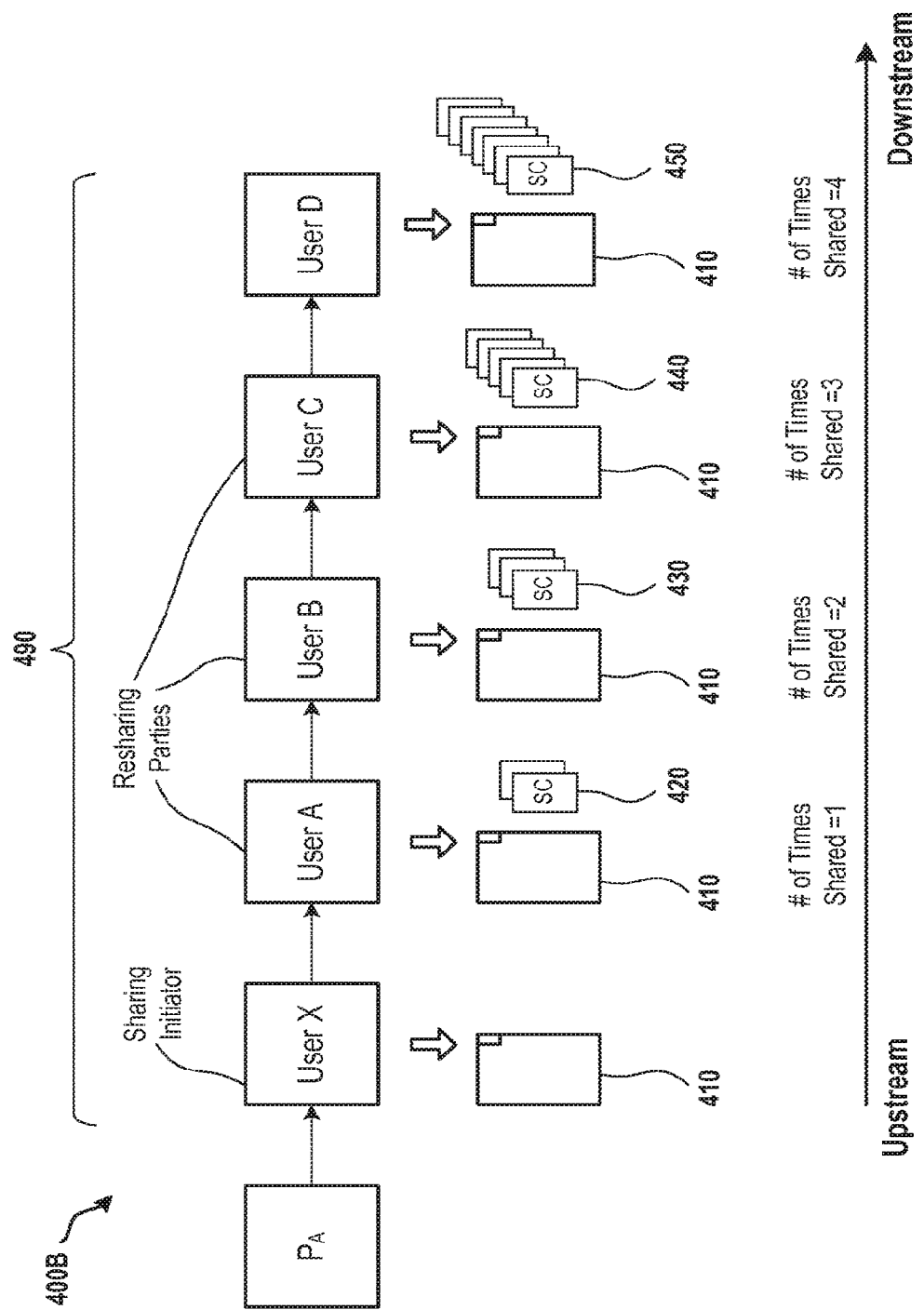

| Use Impression | Use Impression Value | Weightings |
|---|---|---|
| View | A1 | WT1 |
| View + 1 | A2 | WT2 |
| View + Comment | A3 | WT3 |
| View + Share | A4 | WT4 |
| View + Hangout | A5 | WT5 |
| View + Hangout + 1 | A6 | WT6 |
| View + Hangout + Favor +1 | A7 | WT7 |

Fig. 7B

MANAGING SHAREABLE CONTENT IN A SOCIAL NETWORK

CROSS-REFERENCE TO RELATED APPLICATIONS

This application is a continuation of U.S. patent application Ser. No. 13/970,565, filed Aug. 19, 2013, and entitled "Managing Shareable Content in a Social Network," the entirety of which is incorporated herein by reference.

BACKGROUND

Internet applications have grown tremendously over the years, and one area that has seen such growth relates to social network service managements. A social network service is an online service platform that focuses on facilitating the building of social relations among users who share similar interests, activities, backgrounds, or real-life connections. It is in this context that various implementations arise.

SUMMARY

Various implementations of the present disclosure provide methods and computer programs for managing shareable content in a social network. In one implementation, the content is premium, as that content is produced for use or consumption by a party that has been provided with access. In one implementation, the access is provided when the party has paid for the content or has a subscription to a service that provides content to subscription holders. It should be appreciated that the present disclosure can be implemented in numerous ways, e.g., a process, an apparatus, a system, a device, or a method on a computer readable non-transitory medium. Several implementations of the present disclosure are described below.

In some implementations, a method for managing premium content in a social network is provided. The method includes receiving a plurality of articles from a publisher for access to selected users in the social network. The received articles are identified as having premium content and can be accessed by the selected users in the social network. Each of the received articles is assigned a sharing parameter that includes a sharing threshold. The method further includes receiving a request from a first user, who is identified from the selected users of the social network, to share an article identified from the plurality of received articles with a second user in the social network. The second user is provided with access to the article along with supplemental content when the sharing threshold is satisfied. The disclosed method is executed by a processor.

In some implementations, the supplemental content includes advertising that is integrated along with the article when presented to the second user.

In some implementations, the method further includes determining a number of times the article has been shared among users in the social network; and limiting further sharing of the article when the number of times the article has been shared exceeds the sharing threshold associated with the article.

In some implementations, the limiting of further sharing of the article includes making the article non-shareable.

In some implementations, the limiting of further sharing of the article includes allowing the article to be further shared in a form of a truncated version.

In some implementations, the limiting of further sharing of the article includes allowing the article to be further shared in a form of an abstract.

In some implementations, the method further includes recording use data of the article as the article is being shared among users in the social network; and transmitting the use data to the publisher.

In some implementations, the method further includes assigning rewards to the first user of the social network, based on the use data.

In some implementations, the use data of the article includes names of users among whom the article is being shared and use impressions associated with the article for each of the users.

In some implementations, the use data of the article further includes use impressions associated with the supplemental content integrated with the article.

In some implementations, each of the use impressions associated with the article for a user to whom the article is being shared includes a use activity or a combination of use activities for the article.

In some implementations, each of the use impressions is adjustable for relevance based on assigned weightings.

In some implementations, the second user is prevented from accessing other received articles from the publisher except for the article shared from the first user.

In some implementations, the method further includes receiving a request from the second user to share the article with a third user of the social network; and providing the third user with access to the article, the article being presented to the third user with more supplemental content than the supplemental content presented to the second user.

In some implementations, a method for managing premium content in a social network is disclosed. The method includes receiving a plurality of articles that are identified as having premium content from a publisher for access to selected users of a social network and identifying one or more shareable articles from the plurality of received articles. Each of the shareable articles is integrated with supplemental content and is assigned a sharing parameter that includes a sharing threshold. A first user is then identified from the selected users of the social network as having a user account with the publisher. The user account enables the access to the plurality of articles. A request from the first user is received to share a shareable article with a second user of the social network. The second user is provided with the access to the shareable article when the sharing threshold is satisfied, which is presented to the second user with a portion of the integrated supplemental content. The disclosed method further includes recording the use data of the shareable article and transmitting the use data to the publisher.

In some implementations, the method further includes determining a number of times the shareable article has been shared among users in the social network; and limiting further sharing when the number of times the shareable article has been shared exceeds the sharing threshold associated with the shareable article.

In some implementations, the method further includes receiving a request from the second user to share the shareable article with a third user of the social network; and providing the third user with access to the shareable article, the shareable article being presented to the third user with more integrated supplemental content than the portion of the integrated supplemental content presented to the second user.

In some implementations, the method further includes assigning rewards defined by the publisher based on the use data.

In some implementations, the rewards include more shareable articles to the first user.

Other aspects will become apparent from the following detailed description, taken in conjunction with the accompanying drawings.

DESCRIPTION OF DRAWINGS

The disclosure may best be understood by reference to the following description taken in conjunction with the accompanying drawings.

FIG. 4B is a block diagram illustrating the displays of a shareable article and associated supplement content in a sharing chain, in accordance with various implementations of the present disclosure.

FIG. 7B illustrates a table showing the use impressions along with assigned use impression values and weightings for a shareable article, in accordance with various implementations of the present disclosure.

DETAILED DESCRIPTION

The following implementations describe methods for managing content in a social network. It will be apparent, that the present implementations may be practiced without some or all of these specific details. In some implementations, well-known components or methods are not described in detail or are presented in a simple block diagram format in order to avoid unnecessarily obscuring the present disclosure. Particular implementations may vary from the details disclosed and still be contemplated to be within the spirit and scope of the present disclosure.

In some implementations, one of the disclosed methods includes receiving a plurality of articles from a publisher for access to selected users in the social network. The received articles are identified as having premium content and may be accessed by the selected users in the social network. Each of the received articles is assigned a sharing parameter that includes a sharing threshold. The sharing threshold of an article defines the number of times the article is allowed to be shared in the social network. In one example, the number of times the article is allowed to be shared is based on a number of user that access the shared article.

In another example, the number of times the article is allowed to be shared is based on a number of generation levels the article may be shared. As used herein, a generation can be viewed with reference to a parent-child model. A parent (e.g., user) would reside at one generation, while one or more children (e.g., users) can reside in a lower generation below the parent. Similarly, each child (user) can have one or more children, and so on. Broadly speaking, each generation level below an initial sharing parent can have any number of children, and the sharing threshold would be set on limits of generation level sharing, without limit to number of users.

The method further includes receiving a request from a first user, who is identified from the selected users of the social network, to share an article identified from the plurality of received articles with a second user in the social network, and providing the second user with access to the article. The article is presented to the second user with supplemental content.

In some implementations, the method further includes determining the number of times the article has been shared among the users in the social network. If the number of times the article has been shared exceeds the sharing threshold associated with the article, the further sharing of the article is limited. In some implementations, the second user may request to share the article with a third user in the social network. If the sharing threshold has not exceeded, the article may be presented to the third user with more supplemental content than the supplemental content presented to the second user. In some implementations, the sharing threshold is exceeded when the article is shared beyond a set number of generations.

Figure 1A:
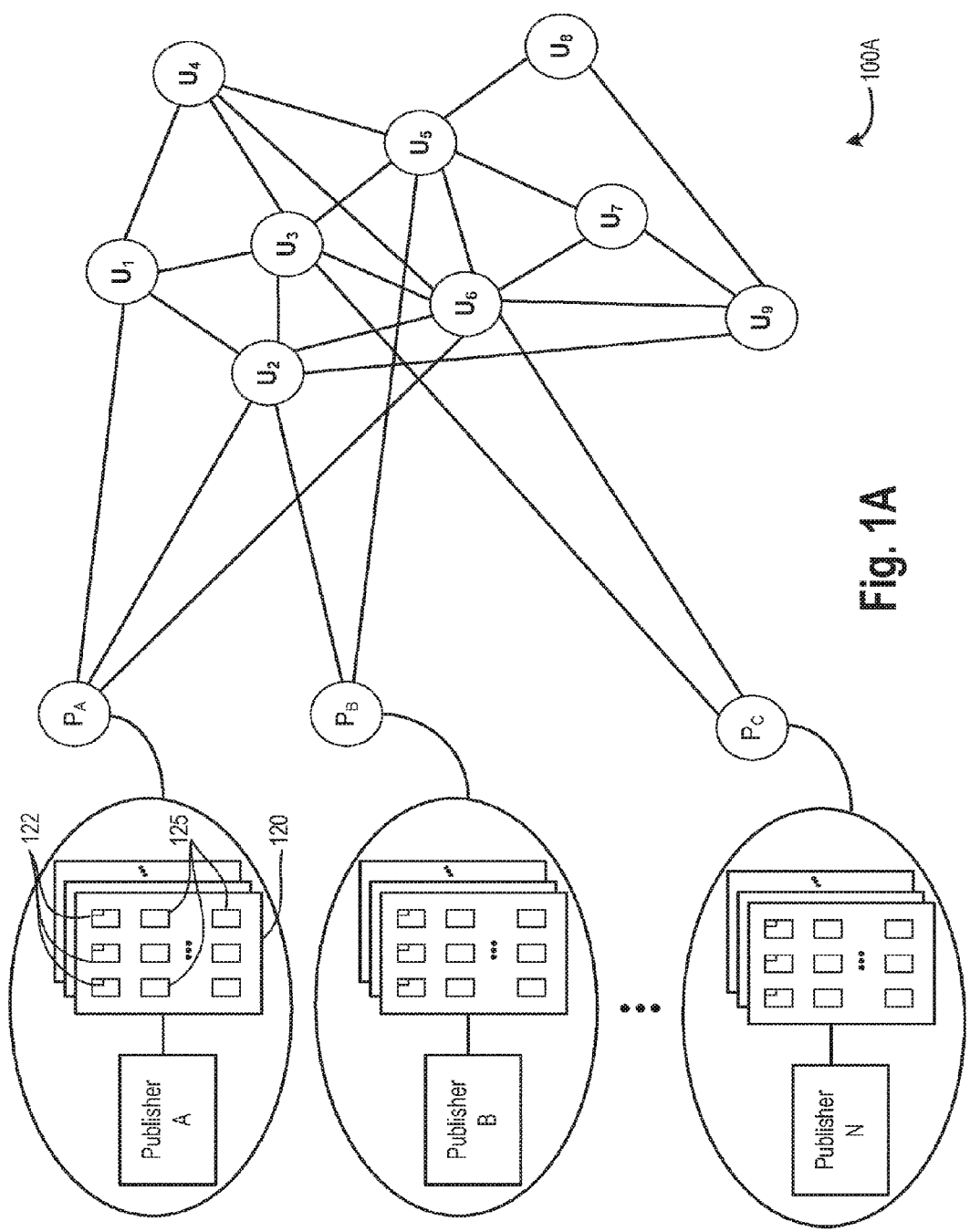
FIG. 1A illustrates a social network for enabling access of the articles provided by publishers, in accordance with various implementations of the present disclosure.

FIG. 1A illustrates a social network 100A for enabling access of the articles provided by publishers, in accordance with various implementations of the present disclosure. In this example, social network 100A includes three publishers ($P_A$, $P_B$, and $P_C$) and nine social network users ($U_1$, $U_2$, ... $U_9$). It is to be understood that in practice, more or less publishers and social network users can be included in social network 100A.

In some implementations, each of the publishers provides a plurality of articles to be accessed by the social network users. For example, publisher $P_A$ may provide a plurality of articles 122 and 125 that are presented in one or more webpages 120 maintained by social network 100A. The plurality of articles 122 and 125 may contain premium content that can be accessed by a selected group of users, e.g., users $U_1$, $U_2$, and $U_6$, who, in one example, are paid subscribers of publisher $P_A$. The rest of social network users do not have the direct access to the premium content articles, e.g., articles 122 and 125, provided by publisher $P_A$.

In some implementations, articles 122 may be identified as shareable articles. The shareable articles may be identified by publisher $P_A$. Alternatively, the shareable articles may be identified by the social network users who have direct access to the premium content articles provided by publisher $P_A$, or by the social network service provider. In some implementations, a publisher, e.g., publisher $P_A$, may define the maximum number of the shareable articles that can be shared by the selected group of users with other users in the social network.

In some implementations, a user who has the direct access to the shareable premium content article may request to share one or more of those shareable premium content articles with his or her social network friends who do not have direct access to those articles. For example, user $U_2$ may request to share one or more of the articles 122 with his or her social network friends (e.g., users $U_3$ and $U_9$) who do not have direct access to those articles. In another example, user $U_3$, in turn, may request to share one or more those articles shared from user $U_2$ with his or her social network friends, e.g., users $U_4$ and $U_5$.

In some implementations, each of the selected group of users for a publisher has a user account with the publisher. The user account of a user enables the user access to the premium content articles provided by the publisher. In some implementations, the social network service provider may maintain a user profile for each of the social network users. The user profile of a user may record the user status with various publishers, the social network group status of the user, and any royalty rewards received by the user from various publishers.

Figure 1B:
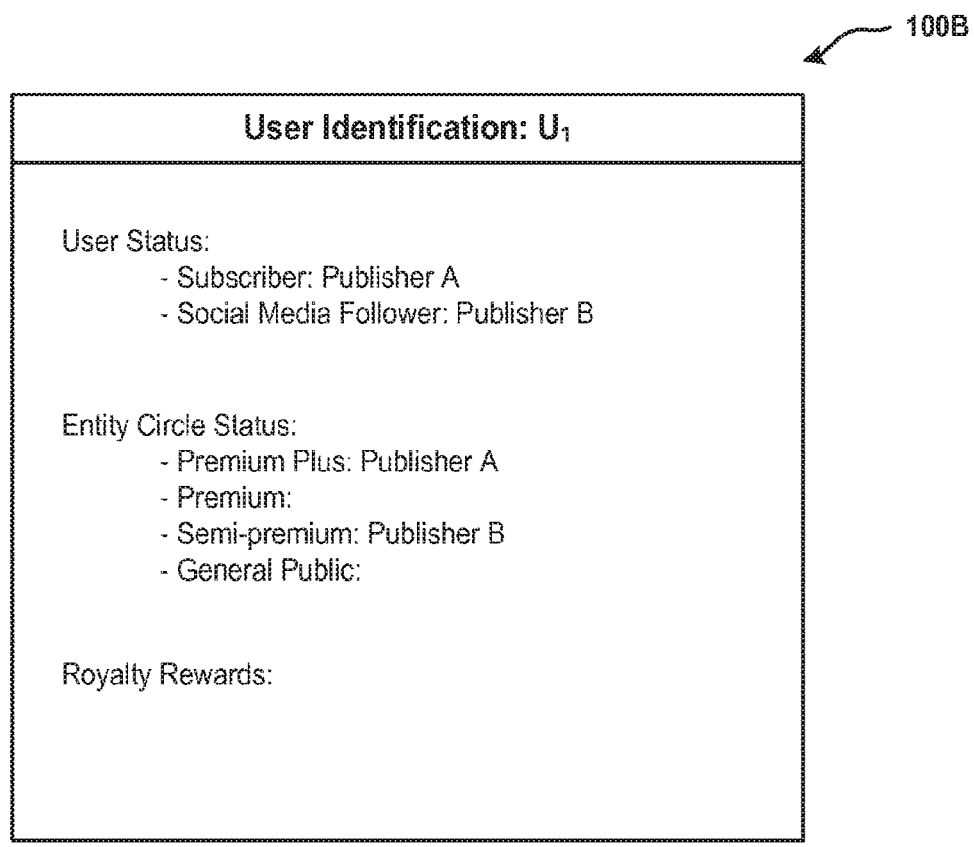
FIG. 1B illustrates a user account associated with a user, e.g., user $U_1$, in accordance with various implementations of the present disclosure.
Figure 2:
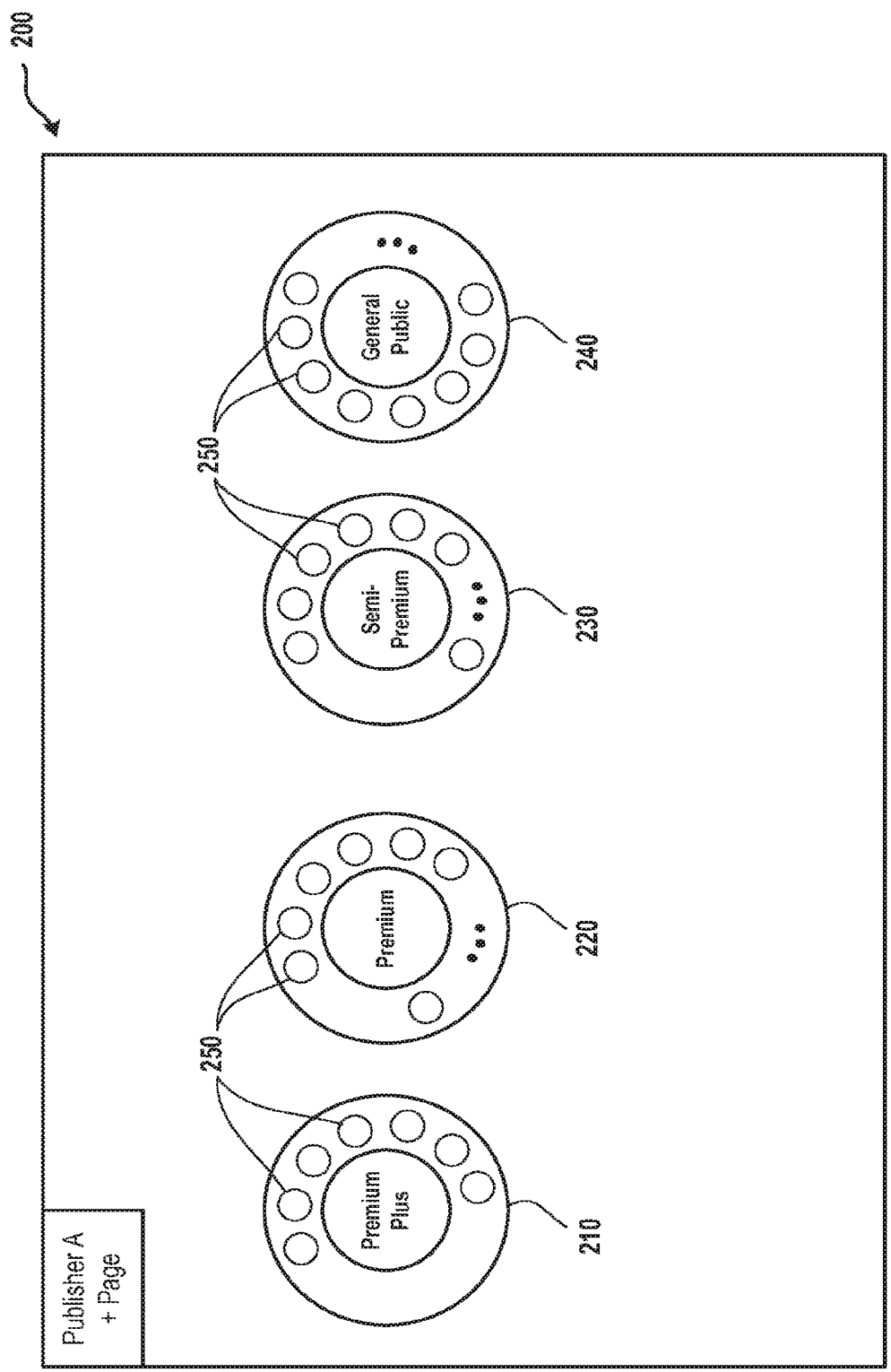
FIG. 2 illustrates a webpage that is maintained by a social network for publisher A, in accordance with various implementations of the present disclosure.

FIG. 1B illustrates a user account 100B associated with a user, e.g., user $U_1$, in accordance with various implementations of the present disclosure. As shown, user profile 100B includes a "User Identification" field, a "User Status" field, an "Entity Circle Status" field, and a "Royalty Rewards" field. The "User Identification" field may be used to identify the social network user ($U_1$) who is associated with user profile 100B. The "User Status" field may be used indicate whether user $U_1$ is a subscriber or a social media follower for a publisher. The "Entity Circle Status" field, which may be used to indicate which user circle (or group) user $U_1$ belongs to, includes a "Premium Plus" subfield, a "Premium" subfield, a "Semi-Premium" subfield, and a "General Public" subfield. FIG. 2 will describe the above-identified user groups in details. The "Royalty Rewards" field may record all rewards user $U_1$ have received from various publishers.

In this example, user $U_1$ may belong to the "Premium Plus" user group for publisher A, because user $U_1$ is a paid subscriber of publisher A. Furthermore, user $U_1$ may also belong to the "Semi-Premium" user group for publisher B, because user $U_1$ is a social media follower for publisher B.

FIG. 2 illustrates a webpage 200 that are maintained by social network 100 for publisher A, in accordance with various implementations of the present disclosure. In some implementations, webpage 200 is a webpage in Google Plus that is a multilingual social networking and identity service, owned and operated by Google Inc. of Mountain View, Calif.

In some implementations, publisher A's users may be divided into four user groups (or circles): Premium Plus 210, Premium 220, Semi-premium 230, and General Public 240, each of which includes a plurality of users 250. In some implementations, when a user group is selected, all of the users who belong to this group will be shown. When publisher A provides an article to social network 100, publisher A may make the article available to all or a selected group of users. For example, publisher A may enable the access to a premium content article to the users in the "Premium Plus" user group, and may enable the access to the premium content articles to the users in the "Premium" user group with supplemental content. The access to the premium content article to the users in the "Premium Plus" and the "General Public" user groups may be disabled by publisher A, unless the premium content article is shared by one of the users who has access to this article.

In some implementations, a user who is a paid subscriber for publisher A may belong to the "Premium Plus" user group. When publisher A provides a premium content article in social network 100, the premium content article may be presented to this user without any supplemental content. A user in the "Premium Plus" user group may have access to all premium content articles provided by the publisher.

In some implementations, a user, who is publisher A's follower and who is active in sharing publisher A's articles accessible to him or her, may belong to the "Premium" user group. When an article is presented to a user in the "Premium" user group, the article may be presented with supplemental content. In some implementations, the supplemental content is one or more advertisements that may or may not be related to the content of the presented article.

In some implementations, a user who is a follower of publisher A in social network 100 may belong to the "Semi-premium" user group. The users in the "Semi-premium" user group may not have direct access to any premium content articles except for the premium content articles shared by the users from either the "Premium Plus" user group or the "Premium" user group. When a premium content article is presented to the user in the "Semi-premium" user group, more supplemental content than the supplemental content presented to the user in the "Premium" user group may be presented to the user in the "Semi-premium" user group along with the premium content article.

In some implementations, a user who is neither a subscriber nor publisher A's follower may belong to the "General Public" user group. The users in the "General Public" user group may have access to one or more premium content articles provided by the publisher if the users in the "Premium Plus" user group, the "Premium" user group, or the "Semi-premium" user group choose to share those premium content articles with the users in the "General Public" user group.

Figure 3A:
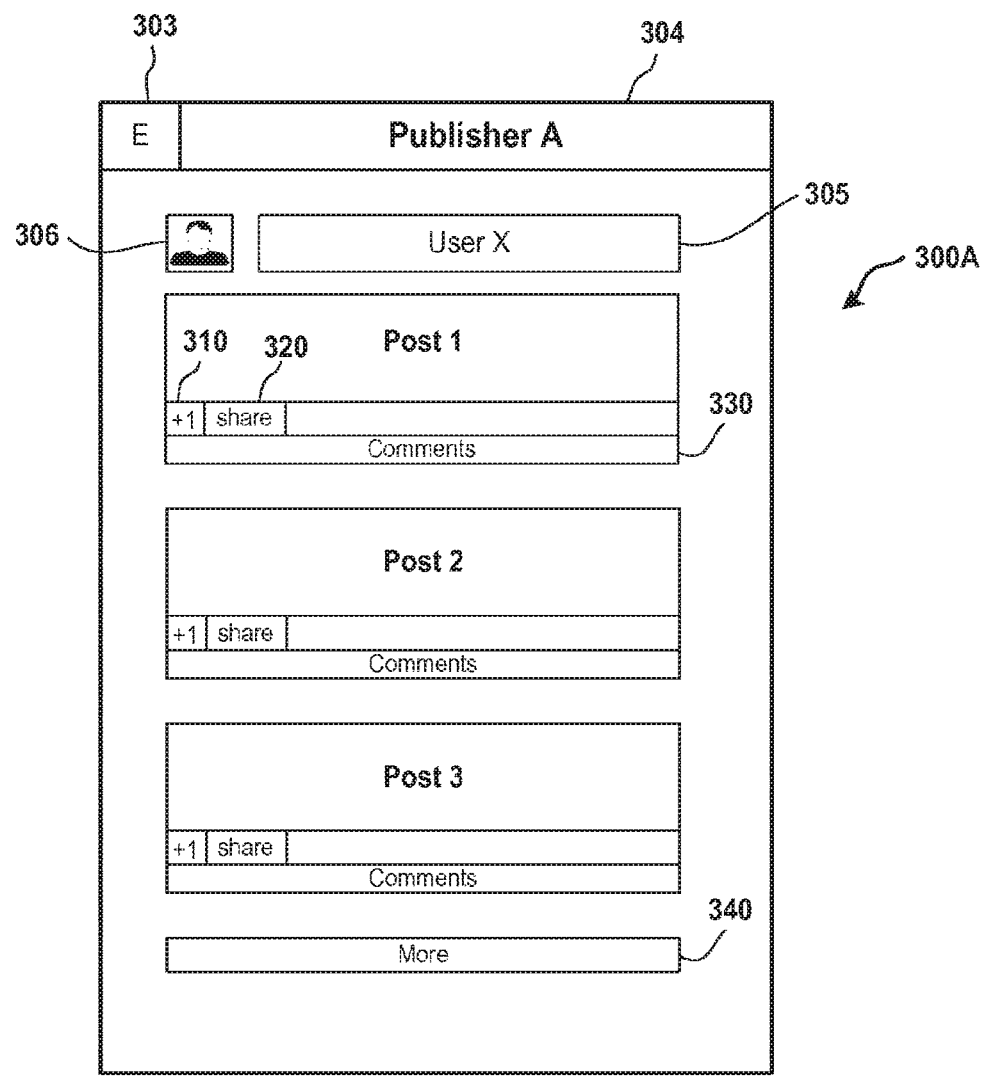
FIG. 3A illustrates a webpage for user X showing the articles provided by publisher A, in accordance with various implementations of the present disclosure.

FIG. 3A illustrates a webpage 300A for user X showing the articles provided by publisher A, in accordance with various implementations of the present disclosure. In some implementations, user X is one of the users in a social network and publisher A is one of content providers for the social network. Webpage 300A is maintained by the social network.

As shown in FIG. 3A, webpage 300A includes a social network provider identity window 303, a publisher identity window 304 that shows the identity of the publisher (Publisher A) who provides the contents presented in webpage 300A, a user identity window 305 that shows the name of the user (User X), and a user image window 306 that shows the picture of the identified user (User X). Publisher A may provide a plurality of articles to user X, and three of the articles are shown in webpage 300A: Post 1, Post 2, and Post 3. In some implementations, the articles provided by publisher A may be shareable or non-shareable. In this example, the three articles (Post 1, Post 2, and Post 3) shown in webpage 300A are shareable. User X may select the "More" button 340 to display other articles provided by publisher A.

In some implementations, user X may endorse a posted article, e.g., Post 1, by selecting the "+1" button 310 shown underneath the posted article Post 1. In some implementations, user X may also share an article, e.g., Post 1, with one or more social network users, e.g., user X's social network friends, by selecting the "Share" button 320 shown underneath the article Post 1. In some implementations, user X may write comments in the "Comments" window 330 for an article, e.g., Post 1.

In some implementations, a sharing parameter is assigned for each shareable article provided by publisher A. The sharing parameter may define the characters of the shareable article. In some implementations, each sharing parameter includes a sharing threshold that defines the number of times the article can be shared among the users in a social network. For example, if the sharing threshold for a shareable article is three, the shareable article can be shared among the users in a social network three times.

Figure 3B:
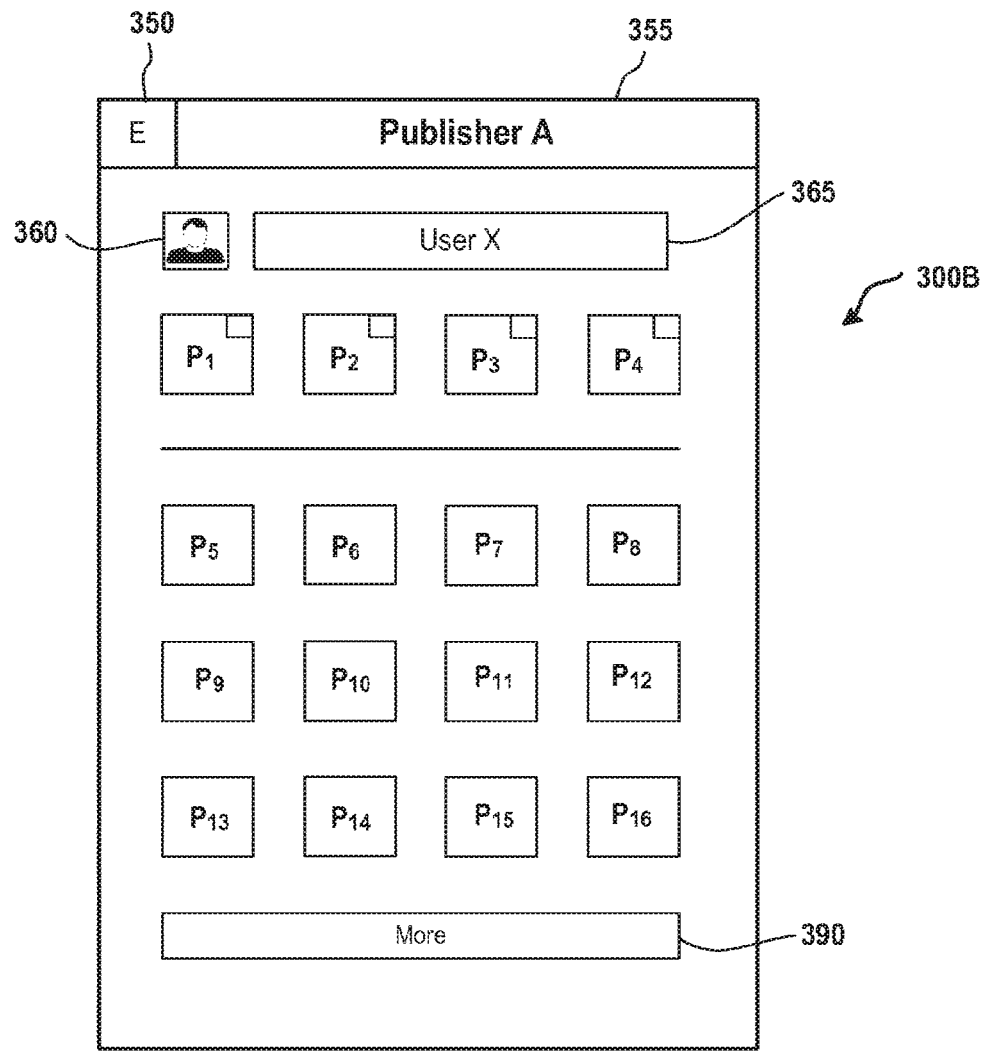
FIG. 3B illustrates a webpage for user X showing articles provided by publisher A, in accordance with various implementations of the present disclosure.

FIG. 3B illustrates a webpage 300B for user X showing articles provided by publisher A, in accordance with various implementations of the present disclosure. In some implementations, user X is a subscriber of publisher A and has a user account with publisher A. The user account of user X is used to enable the access to a plurality of premium content articles provided by publisher A.

As shown in FIG. 3B, webpage 300B includes a social network service identity window 350, a publisher identity window 355, a user image window 360, a user identity window 365, sixteen article icons ($P_1$ to $P_{16}$), and a "More" button 390. In some implementations, each of the sixteen article icons represents one of the sixteen premium content articles provided by publisher A. User X may select the "More" button 390 to enable the display of other article icons that represent other premium content articles provided by publisher A.

In some implementations, user X may select an article icon displayed on webpage 300B to enable the display or presentation of the article represented by the selected article icon. In some implementations, since user X is a subscriber of publisher A, no supplemental content is presented to user X when the article represented by the selected article icon is presented to user X.

Referring back to FIG. 3B, the articles represented by the article icons $P_1$, $P_2$, $P_3$, and $P_4$ have been identified as shareable articles that can be shared by user X with one or more social network friends. In some implementations, the shareable articles are identified by publisher A, which enables the publisher to have the ability to control which premium content article can be shared with other users who otherwise do not have access to the premium content article. Alternatively, the shareable articles may be identified by a user, e.g., user X, based on the user's personal preference. The shareable articles selected by the user indicate to the publisher that those articles are highly valued by the user. Once the publisher knows the user's article preference based on, e.g., user's identification for the shareable articles or the user's use activities associated with the shareable articles, the publisher can customize and adjust the webpage content display to the user.

As discussed above, in some implementations, each of the shareable articles provided by publisher A is assigned a sharing parameter that includes a sharing threshold. The sharing parameters may be obtained from publisher A. The sharing threshold associated with an article can control the number of times the article can be shared, which limits the spread of the article in the social network but still allows user X to provide access to his or her social network friends to the article that is otherwise unavailable to them.

Figure 4A:
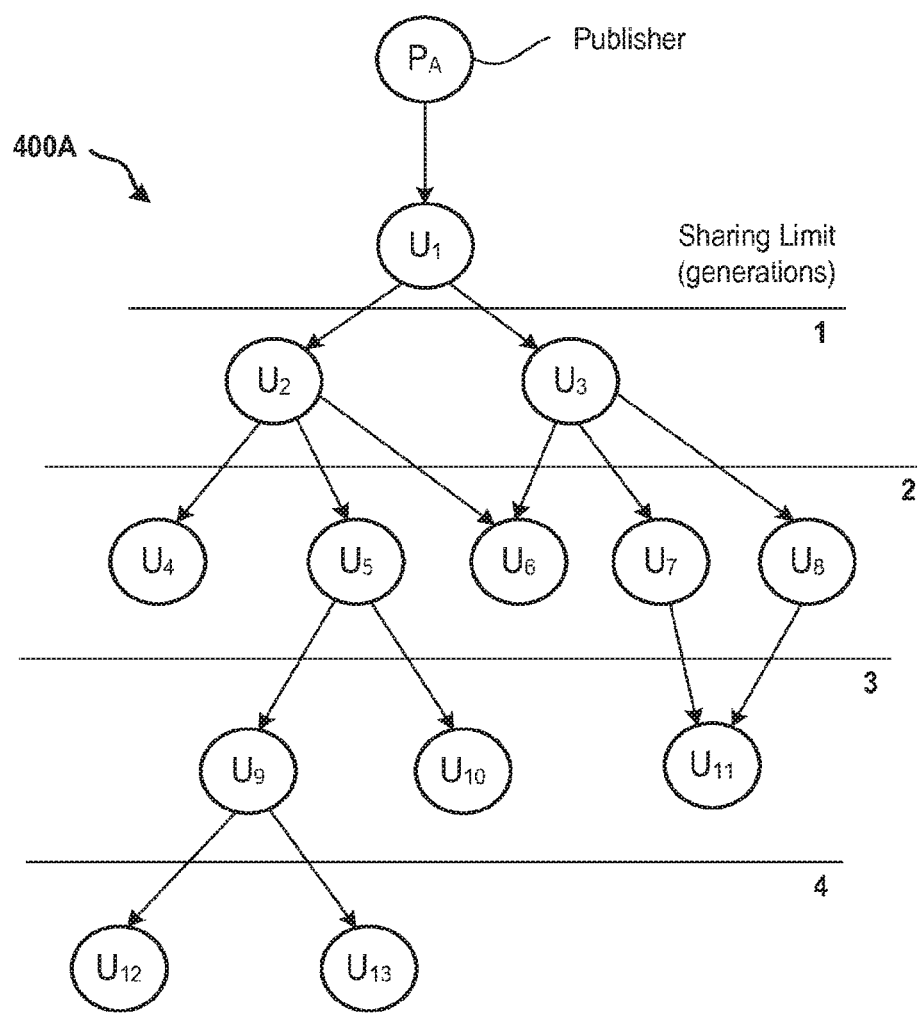
FIG. 4A illustrates a sharing graph showing the social network users who have shared an article provided by publisher A, in accordance with implementations of the present invention.

FIG. 4A illustrates a sharing graph 400A showing the social network users who have shared an article provided by publisher A, in accordance with various implementations of the present invention. Sharing graph 400A includes publisher A ($P_A$) and thirteen users ($U_1$ to $U_{13}$). Although sharing graph 400A shows one publisher and thirteen users, it is to be understood that in practice, more or less publishers and users may be included in a sharing graph.

In some implementations, user $U_1$ is a subscriber of publisher A and has established a user account with publisher A. As a result, user $U_1$ has access to articles having premium content and at least one of the premium content articles is a shareable article. As discussed above, the shareable article may be identified by a publisher, e.g., publisher A. Alternatively, the shareable article may be identified by a user, e.g., user $U_1$.

In some implementations, a sharing parameter is received or assigned to a shareable article provided by publisher A, and the sharing parameter includes a sharing threshold that determines how many times this shareable article can be shared. In this example, the sharing threshold associated with the sharable article that is shared by user $U_1$ with his or her social network friends is fourteen. As shown in FIG. 4A, user $U_1$ is able to share the shareable article with his or her social network friends (e.g., users $U_2$ and $U_3$). User $U_2$ in turn shares the shareable article with users $U_4$, $U_5$, and $U_6$, and user $U_3$ shares the shareable article with users $U_6$, $U_7$, and $U_8$. Then, the shareable article is shared again from user $U_5$ to users $U_9$ and $U_{10}$, and user $U_9$ further shares this shareable article with users $U_{12}$ and $U_{13}$. User $U_{11}$ has access to the shareable article via the sharing of the shareable article from users $U_7$ and $U_8$.

As illustrated in FIG. 4A, some users (e.g., users $U_7$ and $U_8$) in sharing graph 400A share the shareable article once with another user, while other users (e.g., users $U_1$, $U_2$, $U_3$, $U_5$, and $U_9$) in sharing graph 400A share the shareable article with multiple users. The sharing of the article is initiated by user $U_1$. In some implementations, when the shareable article having the premium content is presented to user U1, no supplemental content is presented along with the presentation of the shareable article. When the shareable article is presented to other users (users $U_2$ to $U_{13}$), supplemental content is presented along with the presentation of the shareable article. In some implementations, the more the shareable article is shared among the social network users, the more the supplemental content is presented along with the presentation of the shareable article.

In some implementations, the sharing can be limited not by an absolute number of users that have shared, but by generational level sharing thresholds. In generational level sharing, the actual number of users that share the article is not important, as it may be possible to have many users at each level access and share, so long as their relatedness in generation is within the generation level threshold that is predefined. FIG. 4A also includes lines that separate example generations (1)-(4).

In this example, the first user U1 is would be the first sharing individual (e.g., parent). If the user U1 is allowed to share with just one generation, any number of users in generation 1 can access the article, wherein this example it is users U2 and U3. If the sharing is allowed up to two generations, users in generation 2 can also access the article. Again, although only users U4-U8 are shown, any number of users in that generation would be granted access, as they would fall under the threshold. If the sharing is allowed up to three generations, users in generation 3 would also be granted access to the article. Users U9-U11 are shown with access, but any number of users that lie in this generation threshold would be granted access. The same would be the case if access were granted to generation 4.

FIG. 4B is a block diagram 400B illustrating the displays of a shareable article 410 and associated supplement content 420 in a sharing chain 490, in accordance with various implementations of the present disclosure. In this example, shareable article 410, which is provided by publisher A, is shared from User X→User A→User B→User C→User D in sharing chain 490. User X is the sharing initiator, and User A, User B, and User C are reshaping parties. User X, User A, User B, User C, and User D are social network users in a social network maintained by a social network service provider.

In some implementations, User X has a user account with publisher A and the user account enables the access to the shareable article 410 that is identified as having premium content. When shareable article 410 is accessed by User X, no supplemental content is displayed along with shareable article 410 to User X. After User X shares shareable article 410 with User A, shareable article 410 may be accessed by User A along with supplemental content 420 that is integrated with shareable article 410. In some implementations, after User A shares shareable article 410 with User B, shareable article 410 may be accessed by User B along with supplemental content 430 that is integrated with shareable article 410. Supplement content 430 may be more than supplemental content 420. In some implementations, after User B shares shareable article 410 with User C, shareable article 410 may be accessed by User C along with supplemental content 440 that is integrated with shareable article 410. Supplemental content 440 may be more than supplemental content 430 or 420. In some implementations, after User C shares shareable article 410 with User D, shareable article 410 may be accessed by User D along with supplemental content 450 that is integrated with shareable article 410. Supplemental content 450 may be more than supplemental content 440, 430, or 420.

In some implementations, supplemental content 420, 430, 440, or 450 includes one or more advertisements, some or all of which may or may not related to the content in shareable article 410. In some implementations, the status of a resharing party, e.g., User A, may be checked to determine whether any supplemental content is to be present to this resharing party. For example, if User A is also a paid subscriber of publisher A, no supplemental content is presented to User A along with shareable article 410. Otherwise, supplemental content 420 is to be presented to User A when User A accesses shareable article 410.

In some implementations, supplemental content 450 is integrated with shareable article 410 by either publisher A or the social network service provider, when shareable article 410 is provided to the social network. The social network service provider or the publisher can control when and how much the supplemental content integrated with shareable article 410 is released to the users in sharing chain 490. In some implementations, the higher the number of times the article is shared, the more supplemental content when shareable article 410 is presented to the users in sharing chain 490. For example, when the number of times shared is 1, supplemental content 420 that is a portion of supplemental content 450 may be presented to User A. When the number of times shared is 2, supplemental content 430 that is a portion of supplemental content 450 may be presented to User B. When the number of times shared is 3, supplemental content 440 that is a portion of supplemental content 450 may be presented to User C. When the number of times shared is 4, all of supplemental content 450 is presented to User D.

In some implementations, a sharing threshold is assigned to shareable article 410. For example, the sharing threshold may be determined by publisher A or the social service provider. In another example, the sharing threshold assigned with shareable article 410 may be four. After the sharing threshold of shareable article 410 has been exceeded, shareable article 410 may not be shareable by, e.g., user D to another user in the social network. Alternatively, after the sharing threshold of shareable article 410 has been exceeded, a truncate version of shareable article 410 or the abstract of shareable article 410 may be further shared. Publisher A may prepare multiple forms of shareable article 410 (e.g., full version, truncate version, and abstract) to the social network.

Figure 5:
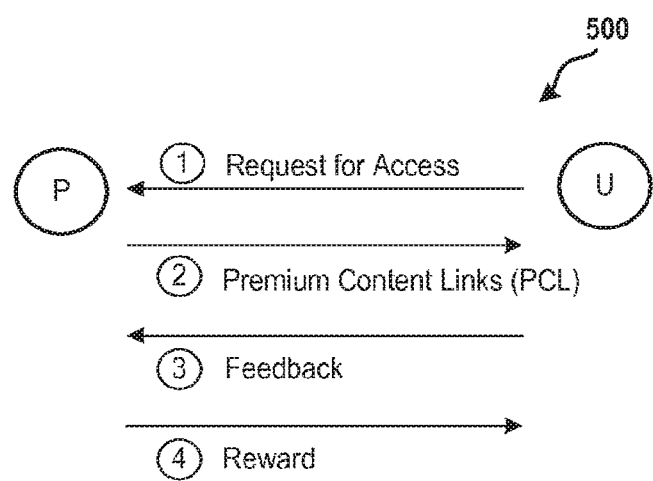
FIG. 5 illustrates a diagram showing the relationships between a publisher (P) and a user (U), in accordance with various implementations of the present disclosure.

FIG. 5 illustrates a diagram 500 showing the relationships between a publisher (P) and a user (U), in accordance with various implementations of the present disclosure. In this example, the user is a registered user having a user account with the publisher. First, the user may request to access the articles having premium content provided by the publisher. The user may request the access by logging into his or her user account registered with the publisher via a social network service. Alternatively, the user may request the access by logging into his or her user account directly in the publisher's website. Furthermore, the user may also request the access to the publisher through weblinks in either emails or text messages sent by the publisher.

In some implementations, after the publisher has established the connection with the user upon receiving the user's request for access, the publisher may send the premium content links (PCL) to the user to enable the user to have access to the premium content articles. As discussed above, in some implementations, some or all of the premium content articles are shareable articles that can be shared by the user with his or her social network friends.

In some implementations, the publisher may collect user feedback, e.g., via the premium content links associated with the premium content articles. In some implementations, the user feedback of a shareable article may include use data related to the shareable article and the use data is collected through the premium content link associated with the shareable article. FIG. 6B will describe the use data associated with a shareable article in details.

In some implementations, based on the feedback, the publisher may send the reward to the user. In some implementations, the rewards may be implemented by providing the user with more shareable articles having the premium content, or with access to more premium content articles. The rewards program may provide incentive for the users who have user accounts with the publisher and encourage them to share the sharable premium content articles to the users who normally do not have access the premium content articles. In some implementations, the publisher may also provide rewards to the resharing parties in the sharing chain initiated by the user, based on the use activities of the resharing parties. For example, the rewards provided to a resharing party in a sharing chain may be a limited number of premium content articles.

Figure 6A:
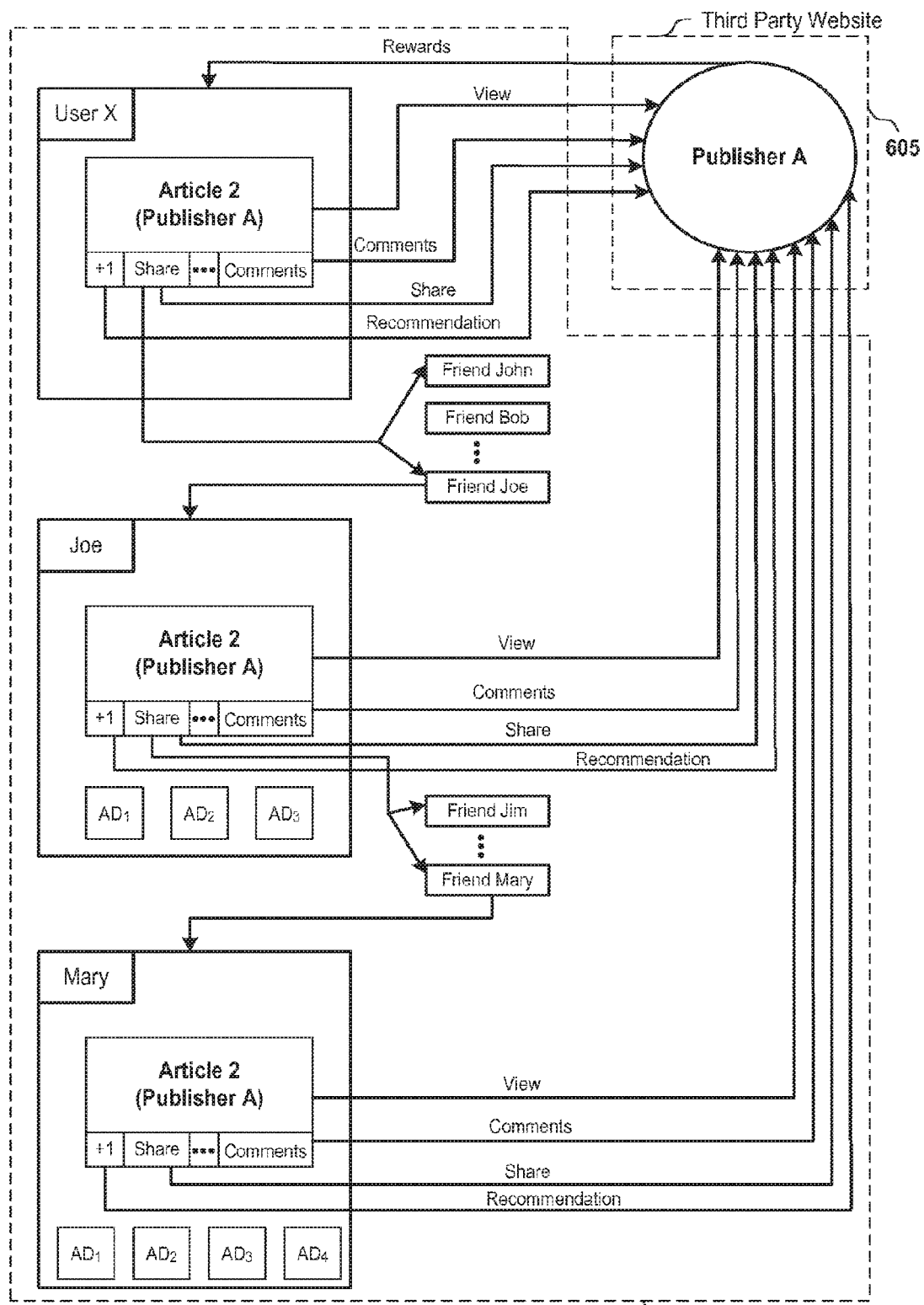
FIG. 6A is a diagram illustrating a sharing process for a shareable article, in accordance with various implementations of the present disclosure.
Figure 6B:
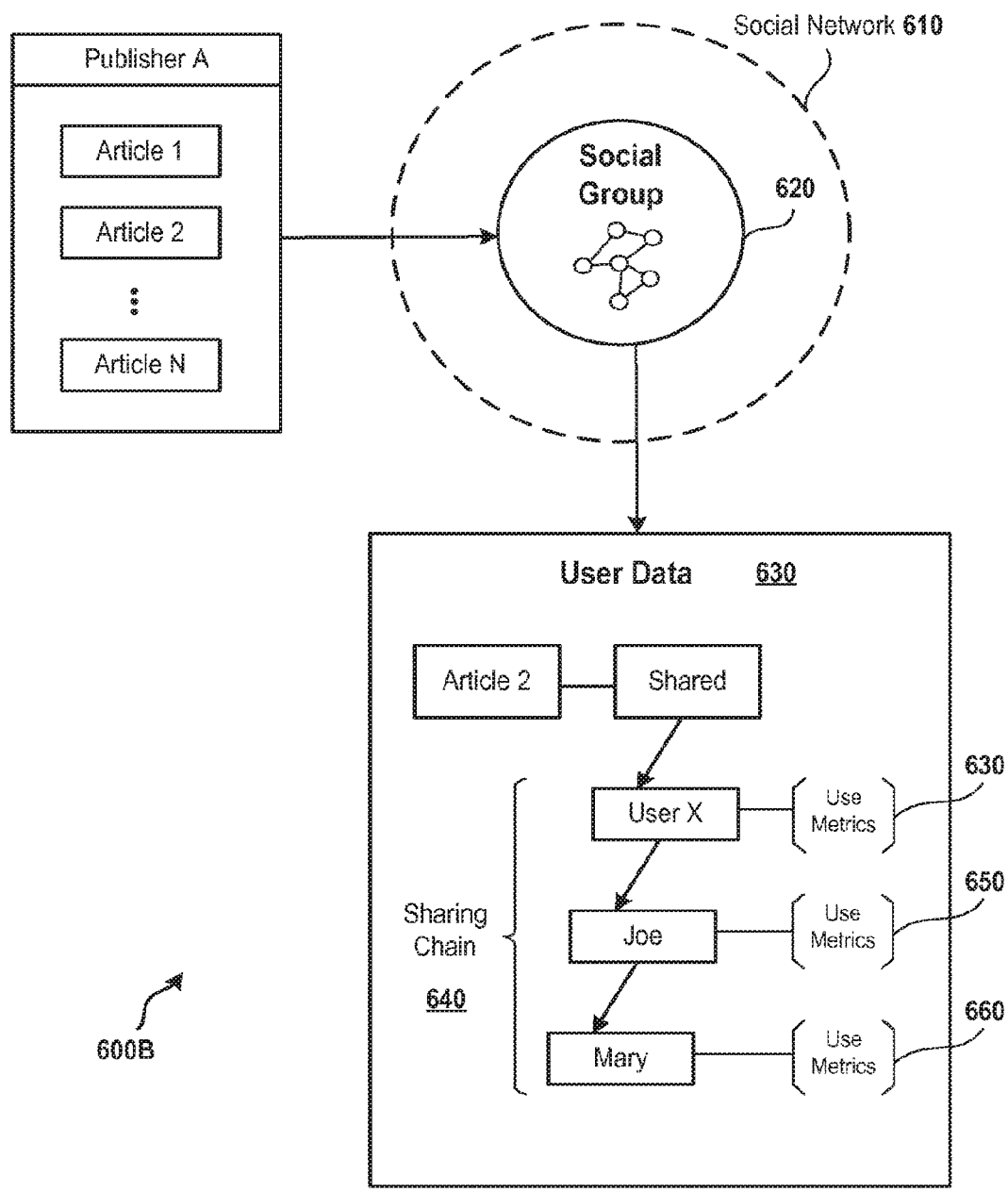
FIG. 6B is a diagram illustrating the use data associated with an article, in accordance with various implementations of the present disclosure.

FIG. 6A is a diagram 600A illustrating a sharing process for a shareable article, in accordance with various implementations of the present disclosure. In this example, publisher A provides the shareable article having premium content, e.g., article 2. In some implementations, user X has a user account with publisher A. User X may establish the connection with publisher A via the user account. Alternatively, user X may establish the connection with publisher A to access the premium content articles via links sent by publisher A in the form of emails or text messages.

In this example, after establishing the connection with publisher A, user X may access article 2, to which user X's friend, Joe, and Joe's friend, Mary, have no direct access because both Joe and Mary are not registered users with publisher A. User X, Joe, and Mary are social network users of social network 610, and publisher A is resided at a third party website 605.

In some implementations, a sharing chain is formed for article 2 after article 2 is shared among the social network users (e.g., user X, Joe, and Mary) in social network 610. In this example, the sharing chain starts with user X, then to Joe, and ends with Mary. It is to be understood that in practice, more or less users could be included in a sharing chain, one user may share an article with multiple users, and one user may receive a shareable article from multiple users. In this example, after having access to article 2 by user X, user X may share article 2 with at least one of his or her social network friends, e.g., Joe. After having the access to article 2, Joe may share article 2 with at least one of his friends, e.g., Mary.

In some implementations, when article 2 is presented to user X, no advertisement is displayed along with the display of article 2. When article 2 is presented to Joe, three advertisements are displayed along with the display of article 2. When article 2 is presented to Mary, four advertisements are displayed along with the display of article 2. As the number of times article 2 is shared increases, the number of advertisements increases as well.

In some implementations, a plurality of use activities may be conducted for article 2, e.g., via the use activity function buttons displayed underneath the display of article 2. For example, the "+1" button may be used to recommend article 2, the "Share" button may be used to share article 2 with the user's social network friends, the "Comment" button may be used to enter comments, either positive or negative, for article 2. It is to be understood that in practice, more use activity functions for an article may be added and the use activity functions may be implemented by other forms, e.g., an input window, a radio button, a selection menu, etc.

In some implementations, after user X has the access to article 2, publisher A may collect the use data related to article 2. The use data for article 2 may include various use activities of a user who is included in the sharing chain. Each use activity increases the visibility of the premium content article to more users. For example, the use activities of a user for article 2 may include, without limitation, the number of times the article is viewed by the user, the recommendation of the article by the user (e.g., via the selection of the "+1" button), the sharing of the article by the user with others (e.g., via the selection of the "Share" button), the comments related to article 2 entered by the user, etc. In other implementations, the use activities of a user may also include, without limitation, whether article 2 has been voted by the user as a favorite article, and whether the article has been presented by the user to a social network video chat group (e.g., Hangout). In some implementations, a weighting may be assigned each use activity or each use activity combinations.

In some implementations, publisher A may provide rewards to the user who initiated the sharing process for article 2, e.g., user X. In some implementations, the rewards provided by publisher A may be more selections of premium content articles that user X normally does not have access to. Alternatively, the rewards may be more shareable articles having premium content that can be shared by user X with his or her social network friends. In some implementations, certain downstream resharing parties (e.g., Joe and Mary) in a sharing chain may also be the candidate for some rewards from a publisher if those resharing parties' use activities for the shareable articles meet a pre-defined threshold. For example, a downstream resharing party may be eligible for a reward from a publisher if this resharing party has shared a certain number of shareable articles provided by the publisher.

FIG. 6B is a diagram 600B illustrating the use data associated with an article, in accordance with various implementations of the present disclosure. The use data associated with an article may include the names of the users in one or more sharing chains, and the use impressions of each user in each sharing chain. The use impressions of each user who is included in one or more sharing chains are stored in a use metrics associated with each user. For example, use metrics 640 is associated with user X and is used to record the use impressions of user X for article 2. Use metrics 650 and user metrics 660 are associated with Joe and Mary, and are used to record the use impressions of Joe and Mary for article 2, respectively.

In some implementations, user X, Joe, and Mary are users in social group 620 of social network 610. As shown in FIG. 6B, article 2, which has been provided by publisher A to social group 620, has been shared among the users (User X→Joe→Mary) in social network 610. In some implementations, use data 630 associated with article 2 include, without limitation, names of the users in sharing chain 640 and the use impressions recorded in each use metrics for each user in sharing chain 640. A use impression of a user for an article may include a use activity or a combination of the user activities of the user. Although use data 630 shows one sharing chain and associated use metrics for each user in sharing chain 640, it is to be understood that in practice, multiple sharing chains may be recorded in use data 630.

In some implementations, use data 630 may also include a use metrics for supplemental content (not shown) integrated with article 2 for each user in sharing chain 640. The use metrics for supplemental content may record any use activities, e.g., the views of the supplemental content presented along with article 2 for each user in sharing chain 640. In some implementations, the use data associated with an article can be passed to the advertisers to indicate the kind of use impressions for the advertisements integrated with the article.

Figure 7A:
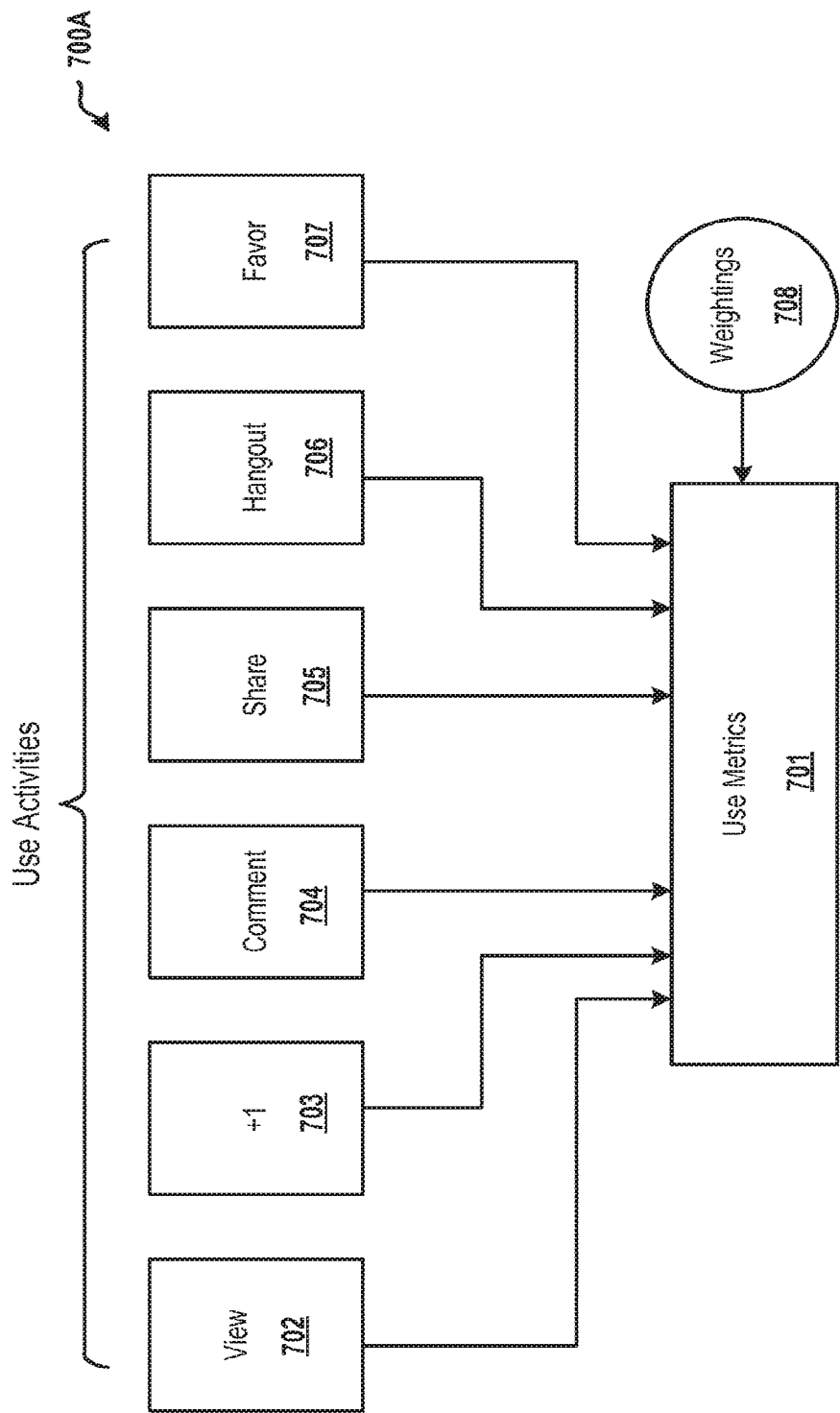
FIG. 7A illustrates a diagram showing various use activities and associated weightings recorded in a use metrics for a user in a sharing chain, in accordance with various implementations of the present disclosure.

FIG. 7A illustrates a diagram 700A showing various use activities and associated weightings recorded in a use metrics 701 for a user in a sharing chain, in accordance with various implementations of the present disclosure.

In some implementations, use metrics 701 may record the following use activities of a user for a shareable article: the number of times the article is viewed 702, the recommendation ("+1") of the article 703, the comments entered for the article 704, the sharing of the article 705, the presentation of the article at a Hangout 706, and the favor of the article 707. In some implementations, certain recorded use activities or certain combinations of the user activates may be assigned weightings 708 based on pre-defined rules that may be defined by the social network service provider. Alternatively, the pre-defined rules may also be defined by the publisher that provides the shareable article. The assigned weightings 708 are also recorded in use metrics 701. Weightings 708 may be used to emphasize or deemphasize certain use activities or certain combinations of the user activities compared to others.

FIG. 7B illustrates a table 700B showing the use impressions along with assigned use impression values and weightings for a shareable article, in accordance with various implementations of the present disclosure. In some implementations, the use impression value for each use impression may vary based on pre-defined rules of the social network service provider. Alternatively, the pre-defined rules may be defined by the publisher who provides the shareable article. The use impression of a user for the shareable article may include a use activity (e.g., View) or a combination of the use activities (e.g., View+Hangout+1).

In this example, table 700B includes a use impression column, a use impression value column, and a weightings column. The use impressions listed in table 700B are: the view of the article, the combination of the view of the article and the recommendation for the article, the combination of the view of the article and the comments entered for this article, the combination of the view of the article and the sharing of the article with others, the combination of the view of the article and the presentation of the article in a Hangout, the combination of the view of the article, the presentation of the article in a Hangout, and the recommendation for the article, and the combination of the view of the article, the presentation of the article in a Hangout, the favor of the article, and the recommendation for the article. It is to be understood that in practice, other use activities of a user or other combinations of use activities may be listed in a table with assigned use impression values and weightings.

As shown in table 700B, each use impression in table 700B is assigned an associated use impression value, e.g., A1, A2, . . . A7, and a weighting, e.g., Wt1, Wt2, Wt3, . . . Wt7. In some implementations, the assigned use impression values and the weightings are pre-defined based on predetermined rules of the social network service provider. The assigned weightings may also be dynamically adjustable based on the monitored use activity changes. In some implementations, an assigned weighting is a value between 0 and 1, where 0 is low importance and 1 is high importance. In still other implementations, weighting values can be larger than 1 and less than 0. In one example, if a particular use impression (e.g., a use activity, or a combination of use activities) in table 700B at some point in time is important, the weighing assigned to the this use impression can be closed to 1, such as 0.85. If a particular use impression is determined to be of low importance, the weighting assigned can be close to 0, such as 0.1 or 0.

Figure 8:
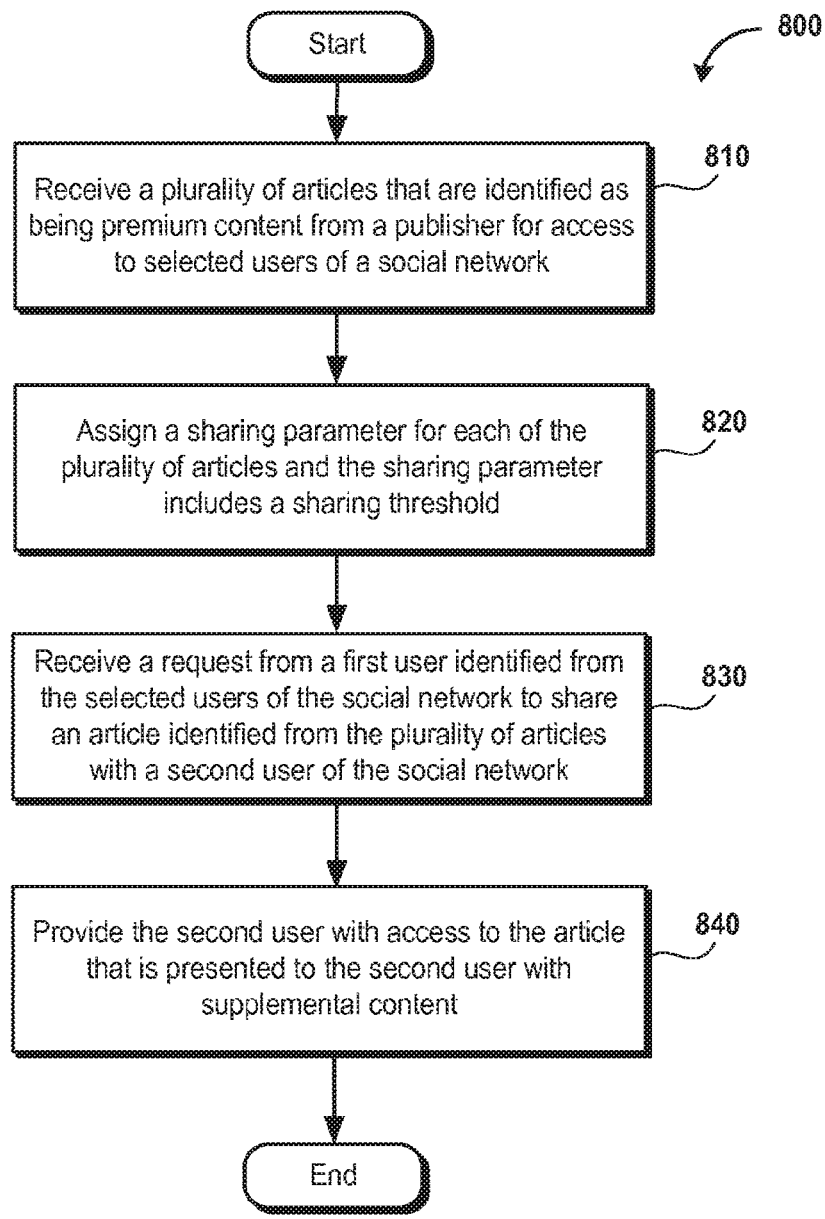
FIG. 8 illustrates a flow diagram of an example method for managing premium content articles in a social network, in accordance with various implementations of the present disclosure.

FIG. 8 illustrates a flow diagram of an example method 800 for managing premium content articles in a social network, in accordance with various implementations of the present disclosure. The method 800 may be executed by one or more processors of one or more servers of a social network system.

In operation 810, a plurality of articles has been received from a publisher. In some implementations, the received articles are identified as having premium content and may be accessed by selected users of the social network. For example, the selected users may be subscribers of the publisher and each of the selected users may have a user account, which enables the access to premium content articles, registered with the publisher.

In operation 820, each of the received articles is assigned a sharing parameter that includes a sharing threshold. In some implementations, the sharing parameter associated with a received article is received from the publisher. Alternatively, the sharing parameter associated with a received article may be obtained from the social network service provider. The sharing threshold associated with an article determines the number of times the article can be shared among the users in the social network. In some implementations, if the number of times the article has been shared exceeds the sharing threshold associated with the article, the further sharing of the article is limited. For example, after the sharing threshold associated with an article has been exceeded, the article may become non-shareable. Alternatively, after the sharing threshold associated with an article has been exceeded, the article may be further shared in a truncated version or in the form of abstract.

In operation 830, a request from a first user to share an article identified from the plurality of articles with a second user of the social network is received. In some implementations, the first user may be identified from the selected users of the social network. The second user is not a user from the selected users of the social network and thereby the second user does not have any access to the plurality of articles having premium content, unless a user from the selected users of the social network shares one or more articles identified from the plurality of premium content articles with the second user.

In operation 840, the second user is provided with the access to the article shared from the first user and the article is presented to the second user with supplemental content. In some implementations, the second user may request to share the article with a third user of the social network. If the sharing threshold of the article has not been exceeded, the article may be presented to the third user with more supplemental content than the supplemental content presented to the second user.

In some implementations, the supplemental content, e.g., advertising, may be integrated with each of the plurality of received articles. For example, a plurality of advertisements may be integrated with each article provided by the publisher. In some implementations, the first user's user status determines whether any advertisements will be presented along with the article when the article is presented to the first user. For example, if the first user is a subscriber of the publisher, no supplemental content is presented along the article. If the first user is a follower of the publisher in the social network, one or more advertisements may be presented to the first user along with the article. However, the advertisements presented to the first user are less than the advertisements presented to the second user, if the article is being shared from the first user to the second user. The advertisements presented to the second user are less than the advertisements presented to the third user, if the article is being shared again from the second user to the third user. As the number of times the article has been shared increases, the number of advertisements to be presented along with the article may be increased as well.

In some implementations, a portion of the plurality of articles received from the publisher is identified as shareable articles. The identification of the shareable articles may be performed by the publisher. Alternatively, the identification of the shareable articles may be performed by a user who has access to the articles. The social network service provider or the publisher may define the maximum number of the articles that can be shared by a user.

In some implementations, the use data associated with each article being shared among the social network users is recorded and the recorded use data is transmitted to the publisher. Based on the use data, the publisher may provide rewards to the user who initiated the sharing process. Alternatively, the rewards may also be provided to the users who actively re-shared a pre-defined number of articles from the publisher.

Figure 9:
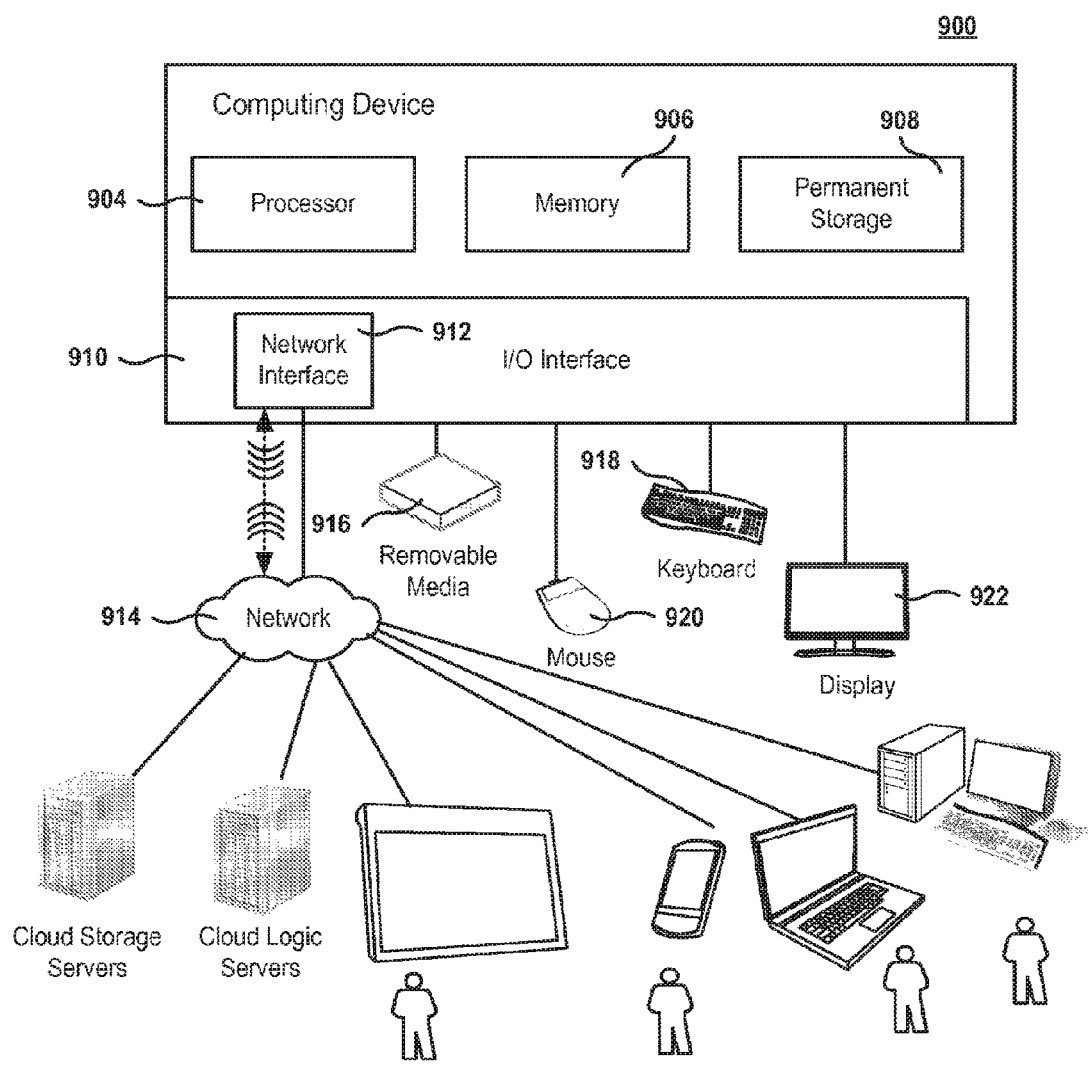
FIG. 9 is a simplified schematic diagram of a computer system for implementing various implementations of the present disclosure.

FIG. 9 is a simplified schematic diagram of a computer system 900 for implementing various implementations of the present disclosure. It should be appreciated that the methods described herein may be performed with a digital processing system, such as a conventional, general-purpose computer system. Special purpose computers, which are designed or programmed to perform only one function, may be used in the alternative. The computer system 900 includes a processor 904, which is coupled through a bus to memory 906, permanent storage 908, and Input/Output (I/O) interface 910.

Permanent storage 908 represents a persistent data storage device such as a hard drive or a USB drive, which may be local or remote. Network interface 912 provides connections via network 914, allowing communications (wired or wireless) with other devices. It should be appreciated that processor 904 may be embodied in a general-purpose processor, a special purpose processor, or a specially programmed logic device. Input/Output (I/O) interface 910 provides communication with different peripherals and is connected with processor 904, memory 906, and permanent storage 908, through the bus. Sample peripherals include display 922, keyboard 918, mouse 920, removable media device 916, etc.

Display 922 is configured to display the user interfaces described herein. Keyboard 918, mouse 920, removable media device 916, and other peripherals are coupled to I/O interface 910 in order to exchange information with processor 904. It should be appreciated that data to and from external devices may be communicated through I/O interface 910. Various implementations of the disclosure can also be practiced in distributed computing environments where tasks are performed by remote processing devices that are linked through a wired or a wireless network.

Various implementations of the present disclosure can be fabricated as computer readable code on a non-transitory computer readable storage medium. The non-transitory computer readable storage medium holds data which can be read by a computer system. Examples of the non-transitory computer readable storage medium include permanent storage 908, network attached storage (NAS), read-only memory or random-access memory in memory module 906, Compact Discs (CD), Blu-Ray™ discs, flash drives, hard drives, magnetic tapes, and other data storage devices. The non-transitory computer readable storage medium may be distributed over a network-coupled computer system so that the computer readable code is stored and executed in a distributed fashion.

Additionally, FIG. 9 shows various types of devices that can connect to the network, such as the internet. The devices include servers, tablet computers, smartphones, laptops, desktops, etc. The various devices run operating systems and the operating systems can vary from manufacturer to manufacturer.

Some, or all operations of the method presented herein are executed through a processor, such as processor 904 of FIG. 9. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Various implementations presented herein recite a device or apparatus. The apparatus may be specially constructed for the required purpose or may be a general purpose computer. The apparatus includes a processor capable of executing the program instructions of the computer programs presented herein.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method comprising:
receiving an article comprising content from a publisher, wherein the article is accessible by a first user of a social network, wherein the article is not accessible by one or more second users of the social network before being shared with the second users in the social network, and wherein the second users are friends of the first user in the social network;
assigning a sharing parameter to the article, wherein the sharing parameter comprises a sharing threshold;
receiving, by a processing device, a request from the first user to share the article with the friends of the first user in the social network;
determining a number of generations that the article has been shared in the social network; and
in response to the receipt of the request from the first user to share the article with the friends of the first user, providing, by the processing device, the second users with access to the article based on a comparison of the sharing threshold with the number of generations that the article has been shared.

2. The method of claim 1, further comprising integrating supplemental content comprising advertising along with the article when presented to the second users.

3. The method of claim 1, further comprising:
limiting further sharing of the article when the number of generations that the article has been shared exceeds the sharing threshold assigned to the article.

4. The method of claim 3, wherein limiting the further sharing of the article comprises making the article non-shareable.

5. The method of claim 3, wherein limiting the further sharing of the article comprises allowing the article to be further shared in a form of a truncated version.

6. The method of claim 3, wherein limiting the further sharing of the article comprises allowing the article to be further shared in a form of an abstract of the article.

7. The method of claim 1, further comprising:
recording use data of the article as the article is being shared among users in the social network; and
providing the use data to the publisher.

8. The method of claim 7, further comprising:
assigning rewards to the first user based on the use data.

9. The method of claim 7, wherein the use data of the article comprises names of the users in the social network among whom the article is being shared and use impressions associated with the article for each of the users among whom the article is being shared.

10. The method of claim 9, wherein the use data of the article further comprises use impressions associated with supplemental content integrated with the article.

11. The method of claim 9, wherein each of the use impressions associated with the article for each of the users among whom the article is being shared comprises a use activity or a combination of use activities for the article.

12. The method of claim 9, wherein each of the use impressions is adjustable for relevance based on assigned weightings.

13. The method of claim 1, wherein the second users are prevented from accessing other articles from the publisher except for the article shared by the first user.

14. The method of claim 2, wherein the second users comprise a second user, wherein one or more third users are friends of the second user in the social network, and wherein the method further comprises:
   receiving a request from the second user to share the article with the friends of the second user in the social network, wherein the article is not accessible by the third users before being shared with the third users in the social network; and
   in response to the receipt of the request from the second user to share the article with the friends of the second user, providing the third users with access to the article based on a comparison of the sharing threshold with the number of generations that the article has been shared, wherein the article is presented to the third users with more supplemental content than the supplemental content presented to the second users.

15. A system comprising:
   at least one memory that stores instructions; and
   at least one processing device configured to execute the instructions to:
      receive a plurality of articles comprising content from a publisher, wherein the plurality of articles is accessible by a first user of a social network, wherein the plurality of articles is not accessible by one or more second users of the social network before being shared with the second users in the social network, and wherein the second users are friends of the first user in the social network;
      identify a shareable article from the plurality of articles;
      assign a sharing parameter to the shareable article, wherein the sharing parameter comprises a sharing threshold;
      identify the first user as having a user account with the publisher, wherein the user account enables access to the plurality of articles by the first user and enables sharing of the shareable article by the first user with the friends of the first user in the social network;
      receive a request from the first user to share the shareable article with the friends of the first user in the social network;
      integrate a first portion of supplemental content with the shareable article in response to a determination that the friends of the first user do not have access to the shareable article;
      determine a number of generations that the shareable article has been shared in the social network;
      in response to the receipt of the request from the first user to share the shareable article with the friends of the first user, provide the second users with access to the shareable article comprising the first portion of the supplemental content based on a comparison of the sharing threshold with the number of generations that the shareable article has been shared;
      record use data of the shareable article; and
      provide the use data to the publisher.

16. The system of claim 15, wherein the processing device is further configured to execute the instructions to:
   limit further sharing of the shareable article when the number of generations that the shareable article has been shared exceeds the sharing threshold assigned to the shareable article.

17. The system of claim 15, wherein the second users comprise a second user, wherein one or more third users are friends of the second user in the social network, and wherein the processing device is further configured to execute the instructions to:
   receive a request from the second user to share the shareable article with the friends of the second user in the social network, wherein the plurality of articles is not accessible by the third users before being shared with the third users in the social network;
   integrate a second portion of the supplemental content with the shareable article in response to a determination that the third users do not have access to the shareable article, further comprising integration of more of the supplemental content in the second portion than the first portion in response to a determination that the shareable content has been shared more generations for the third users than for the second users; and
   in response to the receipt of the request from the second user to share the shareable article with the friends of the second user, provide the third users with access to the shareable article comprising the second portion of the supplemental content based on a comparison of the sharing threshold with the number of generations that the shareable article has been shared.

18. The system of claim 15, wherein the processing device is further configured to execute the instructions to:
   assign rewards defined by the publisher based on the use data.

19. The system of claim 18, wherein the rewards comprise access to more shareable ones of the plurality of articles to the first user.

20. A non-transitory computer-readable media having instructions stored therein that, when executed by a processing device, cause the processing device to:
   receive an article comprising content from a publisher, wherein the article is accessible by a first user of a social network, wherein the article is not accessible by one or more second users of the social network before being shared with the second users in the social network, and wherein the second users are friends of the first user in the social network;
   assign a sharing parameter to the article, wherein the sharing parameter comprises a sharing threshold;
   receive a request from the first user to share the article with the friends of the first user in the social network;
   determine a number of generations that the article has been shared in the social network; and
   in response to the receipt of the request from the first user to share the article with the friends of the first user, provide, by the processing device, the second users with access to the article based on a comparison of the sharing threshold with the number of generations that the article has been shared.

* * * * *